(12) United States Patent
Huiberts et al.

(10) Patent No.: US 11,571,084 B2
(45) Date of Patent: Feb. 7, 2023

(54) COFFEE MACHINE

(71) Applicant: Bravilor Bonamat BV, Heerhugowaard (NL)

(72) Inventors: Johannes Theodorus Emerentia Huiberts, Spanbroek (NL); Romanus Eduard Verhoeven, Heerhugowaard (NL); Leon van der Velden, Winkel (NL); Joost Heijne, Middenbeemster (NL)

(73) Assignee: BRAVILOR BONAMAT BV, Heerhugowaard (NL)

( * ) Notice: Subject to any disclaimer, the term of this patent is extended or adjusted under 35 U.S.C. 154(b) by 382 days.

(21) Appl. No.: 16/853,415

(22) Filed: Apr. 20, 2020

(65) Prior Publication Data

US 2020/0245806 A1 Aug. 6, 2020

Related U.S. Application Data

(63) Continuation of application No. PCT/NL2018/050703, filed on Oct. 23, 2018.

(30) Foreign Application Priority Data

Oct. 23, 2017 (NL) ...................................... 2019779

(51) Int. Cl.
*A47J 31/52* (2006.01)
*A47J 31/46* (2006.01)
(Continued)

(52) U.S. Cl.
CPC ............. *A47J 31/5255* (2018.08); *A23F 5/26* (2013.01); *A47J 31/468* (2018.08); *A47J 31/56* (2013.01)

(58) Field of Classification Search
CPC ........ A47J 31/52; A47J 31/5253; A47J 31/36; A47J 31/5255; A47J 31/469; A47J 31/42;
(Continued)

(56) References Cited

U.S. PATENT DOCUMENTS 7,219,597 B2 * 5/2007 Eicher .................. A47J 31/465
99/302 R
2006/0286262 A1 * 12/2006 Stearns ................... A47J 31/41
426/596

(Continued)

FOREIGN PATENT DOCUMENTS

DE 102015217999 3/2017
EP 1676509 7/2006
(Continued)

*Primary Examiner* — Chris Q Liu
(74) *Attorney, Agent, or Firm* — Peacock Law P. C.; Justin Muehlmeyer; Justin Jackson

(57) ABSTRACT

A coffee machine for producing and dispensing coffee-based beverages comprising: at least one hydraulic pump, a boiler and a brewer unit equipped to receive ground coffee and pass through hot water received from the boiler, and comprising a flow meter to measure the flow of water and a control unit receiving electrical signals from the flow meter and controlling the at least one hydraulic pump to regulate the flow rate of water, wherein the coffee machine incorporates an input of the control unit that establishes a variable set-point value of the flow rate that depends on a desired fixed extraction time of the ground coffee received in the brewer unit, wherein the control unit is arranged to calculate a difference between the variable setpoint value of the flow rate, and a measured value from the flow meter, and that the control unit supplies this difference as an error value to a control tool, and wherein the control tool drives a converter that converts DC power at a powerline into an amplitude variable electrical pulse signal at a driver line that drives the at least one hydraulic pump.

5 Claims, 2 Drawing Sheets

(51) Int. Cl.
*A23F 5/26* (2006.01)
*A47J 31/56* (2006.01)

(58) Field of Classification Search
CPC ........ A47J 31/56; A47J 31/525; A47J 31/002;
A47J 31/24; A47J 31/3623; A47J 31/461;
A47J 31/465; A47J 31/467; A47J
31/5251; A47J 31/3609; A47J 31/3671;
A47J 31/54; A47J 31/542; A47J 31/0605;
A47J 31/0621; A47J 31/0663; A47J
31/0673; A47J 31/30; A47J 31/32; A47J
31/34; A47J 31/401; A47J 31/402; A47J
31/404; A47J 31/405; A47J 31/41; A47J
31/4482; A47J 31/46; A47J 31/468; A47J
31/521; A47J 31/545; A47J 31/00; A47J
31/005; A47J 31/06; A47J 31/08; A47J
31/3604; A47J 31/3628; A47J 31/3633;
A47J 31/3638; A47J 31/40; A47J 31/407;
A47J 31/4485; A47J 31/4496; A23F 5/26
USPC ......... 99/280, 279, 281, 293, 295, 300, 282,
99/275, 284, 285, 290, 291, 323.1, 453,
99/283
See application file for complete search history.

(56) References Cited

U.S. PATENT DOCUMENTS

| | | | | |
|---|---|---|---|---|
| 2008/0050480 | A1* | 2/2008 | Doglioni Majer | A47J 31/525 |
| | | | | 99/280 |
| 2008/0245238 | A1* | 10/2008 | Huiberts | A47J 31/469 |
| | | | | 99/302 R |
| 2009/0136639 | A1* | 5/2009 | Doglioni Majer | A47J 31/5255 |
| | | | | 99/302 R |
| 2014/0157956 | A1* | 6/2014 | Date | F04B 39/121 |
| | | | | 74/99 R |
| 2015/0216355 | A1* | 8/2015 | Duvall | A47J 31/36 |
| | | | | 99/282 |
| 2016/0366905 | A1 | 12/2016 | Diester et al. | |
| 2018/0255962 | A1* | 9/2018 | Vetterli | A47J 31/52 |

FOREIGN PATENT DOCUMENTS

| | | |
|---|---|---|
| EP | 2314182 | 4/2011 |
| KR | 20120117529 | 10/2012 |
| WO | 2015/056241 | 4/2015 |
| WO | 2019/083359 | 5/2019 |

* cited by examiner

COFFEE MACHINE

CROSS-REFERENCE TO RELATED APPLICATIONS

This application is a continuation of International Patent Application No. PCT/NL2018/050703, entitled "Coffee Machine", filed on Oct. 23, 2018, which claims priority to Netherlands Patent Application No. 2019779, entitled "Coffee Machine", filed on Oct. 23, 2017, and the specification and claims thereof are incorporated herein by reference.

BACKGROUND OF THE INVENTION

Embodiments of the present invention relate to a coffee machine for producing and dispensing coffee-based beverages comprising: at least one hydraulic pump, a boiler and a brewer unit equipped to receive ground coffee and pass through hot water received from the boiler, and further comprising a flow meter to measure the flow of water and a control unit receiving electrical signals from the flow meter which controls the at least one hydraulic pump to regulate the flow rate of water. The invention also relates to a method of producing and dispensing coffee-based beverages comprising the steps of heating water and passing the heated water through a brewer unit in which ground coffee is received, wherein the flow of water is measured and controlled.

EP 2 314 182 discloses a coffee machine according to the preamble, which further comprises a system for controlling the dispensing pressure, and a pressure sensor apt to generate a control signal representative of the pressure detected, the pressure sensor being electronically connected to the control unit to detect the dispensing pressure, in which system the hydraulic pump is apt to supply variable quantities of water and can be actuated by an electronic drive controlled by the control unit to regulate the flow rate of water supplied by the pump as a function of a detected dispensing pressure value.

EP 2 314 182 further teaches that if the control unit detects, from the flow rate measurement device, a flow rate which is too low or in general below the flow rate corresponding to the nominal pressure, the dispensing operation is taking place more slowly, because for example the coffee is to finally ground, leading to an increase in the dispensing time with respect to the nominal dispensing time. If on the other hand, the control unit detects a flow rate which is too high, the dispensing operation is taking place to rapidly, because for instance the coffee is to coarsely ground, leading to a reduction of the dispensing time with respect to the nominal dispensing time. Accordingly, when the system detects a flow rate which does not correspond to the optimum flow value, the control unit of EP 2 314 182 adjusts the speed of rotation of the pump until the flow rate reaches the optimum value. The regulation of the flow of water correspondingly causes the dispensing time to be substantially equal to the nominal dispensing time.

The device and method of EP 2 314 182 is consistent with the approach generally adopted in the state of the art that the flow rate of water should be kept as constant as possible at a fixed nominal value. With a thus given constant flow rate of water and an also given optimal dispensing time of the coffee which may be established on the basis of the type, the porosity and the permeability of the coffee received in the brewer unit, best results in the quality of the coffee will only be achieved with one size of coffee cup that receives the brewed coffee. That means that when larger dispensing times are required to fill up larger cups of coffee the ground coffee in the brewer may be over-extracted resulting in bitter tasting coffee. On the other hand, with smaller coffee cups the dispensing time will be smaller than nominal, and the ground coffee in the brewer will be under-extracted which provides an acid taste to the coffee.

DE 10 2015 217 999 discloses a coffee machine for producing and dispensing coffee-based beverages comprising: a hydraulic pump, a boiler and a brewer unit equipped to receive ground coffee and pass through hot water received from the boiler, and comprising a flow meter to measure the flow of water and a control unit receiving electrical signals from the flow meter and controlling the hydraulic pump to regulate the flow rate of water, wherein the coffee machine comprises a PID-controller to control the flow rate depending on a desired fixed extraction time of the ground coffee received in the brewer unit.

One of the objectives of embodiments of the present invention is to maintain a high quality of the coffee received in the coffee cup, independent of the size that is required for dispensing to fill up different sizes of coffee cups.

Another objective of embodiments of the present invention is to provide a machine for brewing coffee wherein the flow rate of the water is varied depending on a desired fixed extraction time of the ground coffee received in the brewer unit. In this way the extraction time can be kept constant at an optimal value relating to the ground coffee received in the brewer unit. Variation of the flow rate of the water then takes care of providing an amount of coffee that is exactly matched to the volume of the coffee cup in which the coffee is to be received.

In DE 10 2015 217 999 a PID controller is applied which has disadvantages in terms of large variations that can occur in the controlled flow rate. Another disadvantage is that this known coffee machine is noisy. Accordingly, it is another objective of embodiments of the present invention to provide a relatively silent coffee machine.

Note that the above discussion is given for more complete background and is not to be construed as an admission that such publications are prior art for patentability determination purposes.

BRIEF SUMMARY OF THE INVENTION

According to an embodiment of the present invention, a coffee machine comprises a control tool wherein the control tool drives a converter that converts DC power at a powerline into an amplitude variable electrical pulse signal at a driver line that drives the at least one hydraulic pump. It has been proven in practice that this manner of control results in a more silent operation of the coffee machine, particularly when the machine operates below full power.

In more specific terms, an embodiment of a coffee machine according to the present invention comprises the feature that the control unit is arranged to calculate a difference between the input of the control unit that provides the variable setpoint value of the flow rate, and a measured value determined with the flow meter and supply this difference as an error value via a signal line to a control tool which drives a converter that converts DC power at a powerline into an amplitude variable electrical pulse signal at a driver line that drives the at least one hydraulic pump. Apart from the sound reduction because of the features of the main claim, the features of the main claim have some further notable advantages. One further advantage is that it makes controlling of the flow easy in the entire range from 0% to 100%. Another further advantage is the linear relation between the amplitude of the electrical pulse signal and the resulting flow from the at least one pump. Further the amount of electromagnetic interference with the environment is minimized, and—as already mentioned—the at least one pump operates more silently than when using other modalities for driving the pump.

Also, other features of the various embodiments of a coffee machine according to the present invention provide notable advantages that contribute to the silent operation and quality of the coffee brewed in this coffee machine.

One preferable feature is that a machine according to the present invention comprises two hydraulic pumps. This not only doubles the capacity of the coffee machine, but also supports the quality of the brewed coffee by maintaining the flow as constant as possible which is made possible by appropriately driving these two hydraulic pumps. Since the respective pumps can contribute to the required capacity at a lower level, the sound burden to the environment is reduced. Best results are achieved when the two hydraulic pumps are placed in parallel and are driven 180° out of phase. By driving the two hydraulic pumps 180° out of phase the pumps will have a sequential working cycle such that when one pump is providing its driving force to the fullest, the other pump is at the verge of reversing its cycle without at that time providing an effective driving force. One thing and another can be compared with the smooth operation of a 12, 8 or even 6-cylinder engine in comparison with the relatively rough and noisy operation of a four-cylinder engine. This benefit is then in particular achieved by driving the two hydraulic pumps in parallel.

The smooth operation of the coffee machine can be further promoted by the feature that a flexible hose connects the at least one hydraulic pump to the boiler.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

Whenever in the figures the same reference numerals are applied, these numerals refer to the same parts.

DETAILED DESCRIPTION OF THE INVENTION

Figure 1:
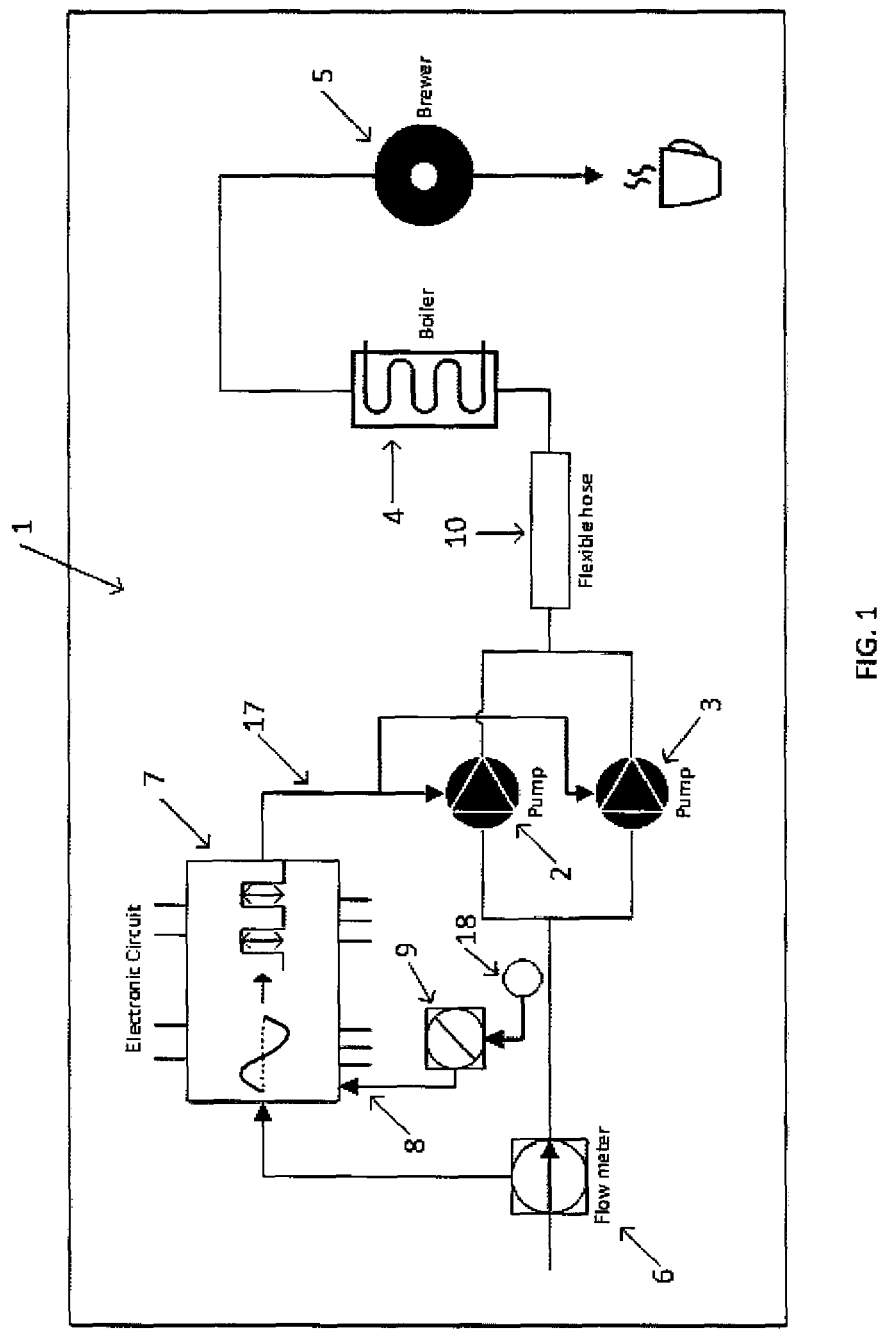
FIG. 1 a schematic drawing of a coffee machine according to an embodiment of the present invention.

FIG. 1 depicts a coffee machine 1 for producing and dispensing coffee-based beverages comprising: at least one hydraulic pump 2, 3, a boiler 4 and a brewer unit 5 equipped to receive ground coffee and pass through hot water received from the boiler 4. The coffee machine 1 further comprises a flow meter 6 to measure the flow of water and a control unit 7 receiving electrical signals from the flow meter 6 and controlling the at least one hydraulic pump 2, 3 to regulate the flow rate of water to the boiler 4.

The coffee machine 1 incorporates an input 8 of the control unit 7 that establishes a variable setpoint value of the flow rate. The input 8 of the control unit 7 for the variable set-point value of the flow rate connects to a setpoint organ 9 that automatically sets the input 8 of the control unit 7 at a value that depends on a desired fixed extraction time of the ground coffee received in the brewer unit 5. This fixed nominal extraction time can be set with an input organ (18) such as a manual input device.

Figure 2:
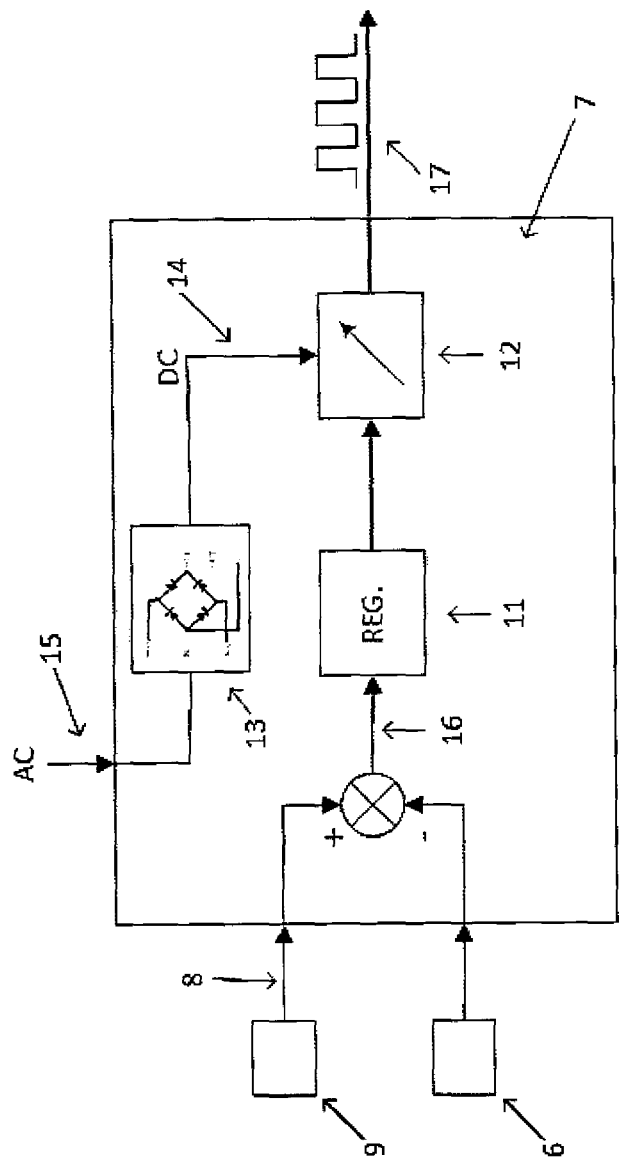
FIG. 2 a detail of the control circuitry of the coffee machine of FIG. 1.

In FIG. 2 a detail is shown of the control unit 7, which is arranged to calculate a difference between the input signal 8 of the control unit 7 that provides the variable setpoint value 8 of the flow rate, and a measured value from the flow meter 6. The control unit 7 supplies this difference as an error value via a signal line 16 to a control tool 11. The control tool 11 drives a converter 12 that converts DC power at a powerline 14 into an amplitude variable electrical pulse signal at a driver line 17. The driver line 17 drives the at least one hydraulic pump 2, 3. The DC power at the powerline 14 is preferably derived from AC power supplied at a powerline 15 which is rectified into a DC voltage by rectifier 13.

Turning back to FIG. 1, it is shown that the coffee machine 1 preferably comprises two hydraulic pumps 2, 3. It also shows that the two hydraulic pumps 2, 3 are placed in parallel. Further the control unit 7 is arranged to control the two hydraulic pumps 2, 3 such that they are driven 180° out of phase.

Finally, it is shown that a flexible hose 10 connects the two hydraulic pumps 2, 3 to the boiler 4.

Although the invention has been discussed in the foregoing with reference to an exemplary embodiment of the coffee machine of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A coffee machine for producing and dispensing coffee-based beverages comprising:
    at least one hydraulic pump;
    a boiler;
    a brewer unit equipped to receive ground coffee and pass through hot water received from the boiler;
    a converter;
    a control tool;
    a flow meter to measure the flow of water; and
    a control unit receiving electrical signals from the flow meter and controlling said at least one hydraulic pump to regulate the flow rate of water, wherein said coffee machine incorporates an input of said control unit that establishes a variable setpoint value of the flow rate that depends on a desired fixed extraction time of the ground coffee received in said brewer unit, wherein said control unit is arranged to calculate a difference between the variable setpoint value of the flow rate, and a measured value from said flow meter, and that said control unit supplies this difference as an error value to said control tool, wherein said control tool drives said converter that converts DC power at a powerline into an amplitude variable electrical pulse signal at a driver line that drives said at least one hydraulic pump.

2. The coffee machine according to claim 1, wherein the input of said control unit for the variable setpoint value of the flow rate connects to a setpoint organ that automatically sets the input of said control unit at a value that depends on a desired fixed extraction time of the ground coffee received in said brewer unit as selected with an input organ.

3. The coffee machine according to claim 1, wherein said coffee machine comprises two hydraulic pumps.

4. The coffee machine according to claim 3, wherein said two hydraulic pumps are placed in parallel and are driven 180 degrees out of phase.

5. The coffee machine according to claim 1, wherein a flexible hose connects said at least one hydraulic pump to said boiler.

\* \* \* \* \*